Aug. 1, 1933.      J. R. HOTCHKIN      1,920,792
NUT LOCK

Filed Dec. 18, 1929

J. R. Hotchkin INVENTOR
BY
Thomas Howe ATTORNEY

Patented Aug. 1, 1933

1,920,792

UNITED STATES PATENT OFFICE 1,920,792

NUT LOCK

James Rowland Hotchkin, Montclair, N. J., assignor to The Palnut Company, a Corporation of New Jersey Application December 18, 1929. Serial No. 414,859

3 Claims. (Cl. 151—37)

My invention relates to locking nuts of the type in which a single integral member of sheet metal is formed into a nut adapted to be screwed on to an ordinary threaded bolt and which, when once turned into its final position, automatically holds itself against working loose or against accidental displacement.

My invention constitutes an improvement upon locking nuts of the general type shown in Patent No. 1,161,317, dated November 23, 1915, to Kielland.

Among the objects I seek to accomplish are the following:—

1. To provide the nut with anchor feet, spaced radially outward from a common center, and so formed and arranged as to bite into a board, plate or other member against which the nut is jammed, the anchor feet thus tending to prevent the nut from working loose or becoming accidentally displaced.

2. To space the aforesaid anchor feet of the nut as far as practicable from the central axial line upon which the nut is turned, so as to increase to a maximum the leverage of each anchor foot in holding the nut and thus preventing it from working loose or becoming accidentally displaced.

3. To give the nut such appropriate form as will distribute and equalize as far as practicable a number of stresses to which the nut is necessarily subjected while in use; and by so doing, to virtually strengthen the nut as a whole and the various parts thereof.

4. To give the nut such form as to provide increased resiliency between the threaded portion engaging the bolt thread, and the anchor feet to allow the nut to take up any variations in bolt tension that may arise from expansion or contraction of the bolt or of the members held together by the bolt, and to constantly exert a spring pressure to prevent backing off of the nut.

5. To provide a nut, the anchor feet of which are in contact with the member held by the nut, such contact causing the feet to hold by their friction, or biting tending against such member, so that the nut will remain stationary and resist rotation when the bolt or screw is turned into it, thus eliminating the necessity of using a wrench to hold the nut during assembly.

6. To give the nut such form as to improve its general efficiency in a number of different ways.

Reference is made to the accompanying drawing forming a part of this specification, and in which like reference characters indicate like parts throughout the several figures.

Figure 1:
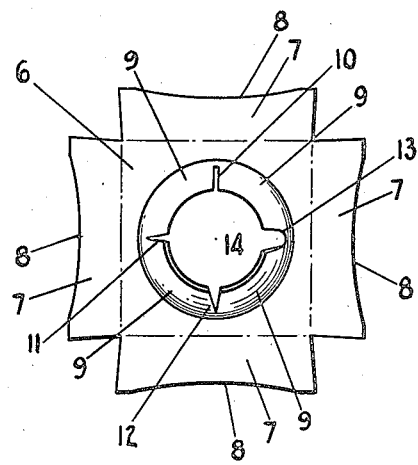
Figure 1 is a front elevation of a sheet metal blank used in making one form of my improved locking nut.

In making the locking nut shown in Figures 1 to 4 inclusive I use the blank 6 shown in Figure 1. This blank is made of spring sheet metal, such as steel, aluminum or brass, and is preferably made in a single integral piece.

The blank 6 is provided with wings 7, here shown as four in number. Each wing 7 is provided upon its outermost edge with a concave surface 8, and the blank is further provided with tongues 9 extending inwardly and cupped. The tongues 9 are separated by notches 10, 11, 12, 13 and these notches merge into a central opening 14.

The inner edges of the tongues 9 are so bent or formed as to constitute a thread of appropriate pitch to engage a bolt, as hereinafter more particularly described.

Figure 2:
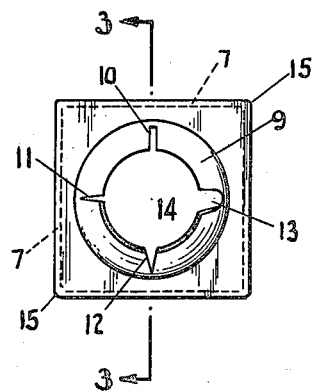
Figure 2 is a front elevation of the locking nut made from the blank shown in Figure 1.
Figure 3:
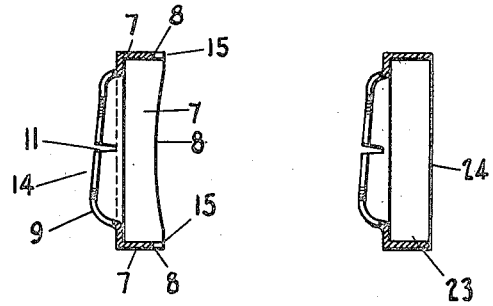
Figure 3 is a section on the line 3—3 of Figure 2, looking in the direction indicated by the arrows.

The wings 7 are each bent to a right angle relatively to the general plane of the blank 6, as indicated in Figures 2 and 3, and corners are thus formed, as may be understood from Figure 3.

These corners are each substantially L-shaped, and each have an anchor foot 15 peculiarly adapted to engage and slightly bite into any plate or other member against which they are forced by the nut.

The nut when finished is of such form that the tongues 9 have collectively the proximate form of a dome which extends in the opposite direction from the anchor feet 15, relative to the general plane of the nut, so that when the feet 15 are brought into engagement with any plane surface, the dome 9 extends outwardly or away from such surface.

Figure 4:
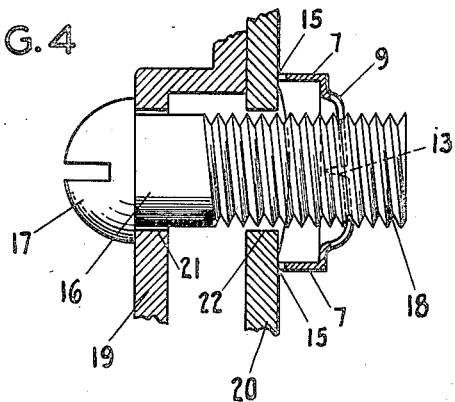
Figure 4 is a substantially vertical section showing the nut appearing in Figure 2, as used with an ordinary bolt for holding together other parts.

The nut above described is well adapted for use with a bolt 16 of conventional form, this bolt having a head 17 and a thread 18, as shown in Figure 4.

The bolt 16 extends through a spider plate 19 and a flat plate 20, which for this purpose are provided respectively with holes 21 and 22.

It will be noted that the anchor feet 15, coinciding in location with the corners of the nut, are spaced equidistant and that each of them is spaced as far from the common center or central axial line of the nut as can be permitted by the dimensions of the nut. This is of great advantage, as may be understood by considering each foot 15 as located at the outermost end of an imaginary lever radiating outwardly from a common center. If each of the feet 15 bites slightly into the adjacent surface of the flat plate 20, or even presses firmly against the same, and any force is thereafter brought to bear upon the nut as tending to displace the feet, such force must operate at a disadvantage because the foot is at the long or outer end of the imaginary lever. In other words the holding power or pawl-like action of each foot is greatly enhanced by locating the foot as far as possible from the center of rotation, and this is attained by locating each foot to coincide with a corner of the nut. Also the wings 7 in the finished nut provide a polygonal sided section which serves as a wrench hold as in the manner of an ordinary nut. Another advantage of the construction described is that the point of engagement of the nut with the bolt thread is at a considerable distance from the points of support of the nut (the wings or sides 7), especially as compared with that of the Kielland patent referred to, so that when the nut is tightly set up there is more spring between its point of engagement with the bolt thread and the sides of the nut, which spring action tends to always maintain the nut threads tightly pressed against those of the bolt.

Figure 5:
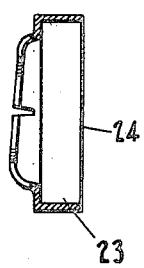
Figure 5 is a section somewhat similar to Figure 3, but showing another form of my device.

In the form shown in Figure 5 the body of the nut appears at 23 and is of the same construction as the one above described, with the exception that it is bounded by edges 24 which are straight instead of curved, and which are adapted to make contact along the full length of the wall, instead of only at the corners. The edges 24 act as anchor feet.

The form shown in Figure 5 has the advantage of greater crushing strength, whereas the other form has some advantage in the greater holding power of the nut.

The operation of my improved locking nut may be readily understood from the foregoing description. Generally speaking the nut is used in practice after the manner of other nuts made of sheet metal and heretofore known in the art.

My improved nut in either of its forms is adapted for use in relations where, owing to jars, knocks and other accidental disturbances, or to expansion and contraction due to changes in temperature, there might otherwise be danger of a nut working loose.

Either form of my invention marks an improvement over analogous devices of the prior art, in that for a given weight of metal my improved locking nut has a much higher efficiency.

Having thus described my invention, which I claim as new and desire to secure by Letters Patent, is as follows:—

1. A locking nut made of sheet metal comprising flat sides substantially parallel to the axis of the nut and a top with an opening therein, said sides enclosing a hollow space, said top being formed into a dome from spring members whose upper sides are convex and adapted to fit a screw thread, said members being outside of said space and surrounding an opening to said space, one side of said dome being higher than the other, and the intersection of said sides having corners forming anchor feet lower than the sides, for engagement with a surface against which the nut is to be forced.

2. A locking nut made of sheet metal comprising flat sides substantially parallel to the axis of the nut and a top with an opening therein, said sides enclosing a hollow space, said top being formed into a dome from spring members whose upper sides are convex and adapted to fit a screw thread, said members being outside of said space and surrounding an opening to said space, one side of said dome being higher than the other.

3. A locking nut made of sheet metal comprising flat sides substantially parallel to the axis of the nut and adapted to form a wrench hold, and a top with an opening therein, said sides enclosing a hollow space beneath said top, said top being convex thereby having a raised central spring structure adapted to fit a screw thread.

JAMES ROWLAND HOTCHKIN.